(12) United States Patent
Green (10) Patent No.: US 9,388,479 B2
(45) Date of Patent: Jul. 12, 2016

(54) HEAT TREATMENTS OF ALM FORMED METAL MIXES TO FORM SUPER ALLOYS

(71) Applicant: MATERIALS SOLUTIONS, Worcester (GB)

(72) Inventor: Gordon Green, Bristol (GB)

(73) Assignee: Materials Solutions, Worcester (GB)

( * ) Notice: Subject to any disclaimer, the term of this patent is extended or adjusted under 35 U.S.C. 154(b) by 0 days.

(21) Appl. No.: 14/600,819

(22) Filed: Jan. 20, 2015

(65) Prior Publication Data

US 2015/0259769 A1    Sep. 17, 2015

Related U.S. Application Data

(63) Continuation of application No. 13/275,694, filed on Oct. 18, 2011, now Pat. No. 8,986,604.

(60) Provisional application No. 61/394,863, filed on Oct. 20, 2010.

(51) Int. Cl.
| | |
|---|---|
| *C22C 1/04* | (2006.01) |
| *B22F 3/10* | (2006.01) |
| *B22F 3/105* | (2006.01) |
| *B22F 3/24* | (2006.01) |

(Continued)

(52) U.S. Cl.
CPC ............ *C22C 1/0433* (2013.01); *B22F 3/1039* (2013.01); *B22F 3/1055* (2013.01); *B22F 3/24* (2013.01); *B22F 7/02* (2013.01); *C22C 1/0491* (2013.01); *B22F 2003/247* (2013.01); *B22F 2003/248* (2013.01); *B33Y 10/00* (2014.12); *Y02P 10/295* (2015.11)

(58) Field of Classification Search
CPC ...... B22F 3/1055; B22F 1/0003; B22F 1/039; C22C 1/0433
USPC .......................................................... 419/23
See application file for complete search history.

(56) References Cited

U.S. PATENT DOCUMENTS

| | | |
|---|---|---|
| 3,802,938 A | 4/1974 | Collins et al. |
| 4,717,435 A | 1/1988 | Kawasaki et al. |

(Continued)

FOREIGN PATENT DOCUMENTS

| | | |
|---|---|---|
| DE | 10039144 C1 | 11/2001 |
| DE | 10039143 C1 | 1/2002 |
| WO | 02092264 A1 | 11/2002 |

OTHER PUBLICATIONS

British Search Report Dated November 10, 2010 in GB10176923.3.

(Continued)

*Primary Examiner* — Weiping Zhu
(74) *Attorney, Agent, or Firm* — Volentine & Whitt, PLLC (57) ABSTRACT

A method of forming an article includes forming a layer of a mixture of at least two distinct metal powders selected such that when combined they are chemically in the proportions of a superalloy containing a gamma prime phase, and fusing the powders locally without diffusion to define the shape of a part of the article such that the materials of the distinct metal powders remain substantially chemically segregated forming regions of different chemical composition. The method further includes repeating the forming and fusing until the derived article is formed, and heat treating the finished article such that at least one of the distinct separate materials diffuses to form a gamma prime phase containing superalloy with the other.

15 Claims, 4 Drawing Sheets

(51) Int. Cl.
   *B22F 7/02*   (2006.01)
   *B33Y 10/00*   (2015.01)

(56) References Cited

U.S. PATENT DOCUMENTS

| | | | |
|---|---|---|---|
| 5,296,062 A | 3/1994 | Bourell et al. | |
| 5,745,834 A * | 4/1998 | Bampton | B22F 3/10 419/37 |
| 6,454,885 B1 | 9/2002 | Chesnes et al. | |
| 2004/0079742 A1 | 4/2004 | Kelly | |
| 2005/0191200 A1 | 9/2005 | Canzona et al. | |
| 2006/0083652 A1 | 4/2006 | Liu et al. | |
| 2009/0255256 A1 | 10/2009 | Mcmasters et al. | |

OTHER PUBLICATIONS

GB Search Report Dated February 28, 2012.

* cited by examiner

HEAT TREATMENTS OF ALM FORMED METAL MIXES TO FORM SUPER ALLOYS

This is a Continuation of U.S. non-provisional patent application Ser. No. 13/275,694, filed Oct. 18, 2011, and a claim of priority is made to U.S. provisional patent application No. 61/394,863, filed Oct. 20, 2010, both of which are incorporated hereby by reference in their entirety.

BACKGROUND

This invention relates to the processing of metal powders, for example, by a combination of thermally based (e.g. laser, or electron beam) Additive Layer Manufacturing (ALM) and subsequent heat treatments that then form a superalloy and in particular gamma prime phase containing superalloys.

Superalloys are alloys strengthened not only by the nature of their matrix and chemistry but also by the presence of special strengthening phases, usually precipitates. For a fuller description of superalloys see "Superalloys: A Technical Guide" ASM International ISBN 0-87170-749-7 and "The Superalloys: Fundamentals and Applications" Cambridge University Press ISBN-10 0-521-85904-2. These are alloys that have been developed recently for use in rocket and jet engines.

Figure 1:
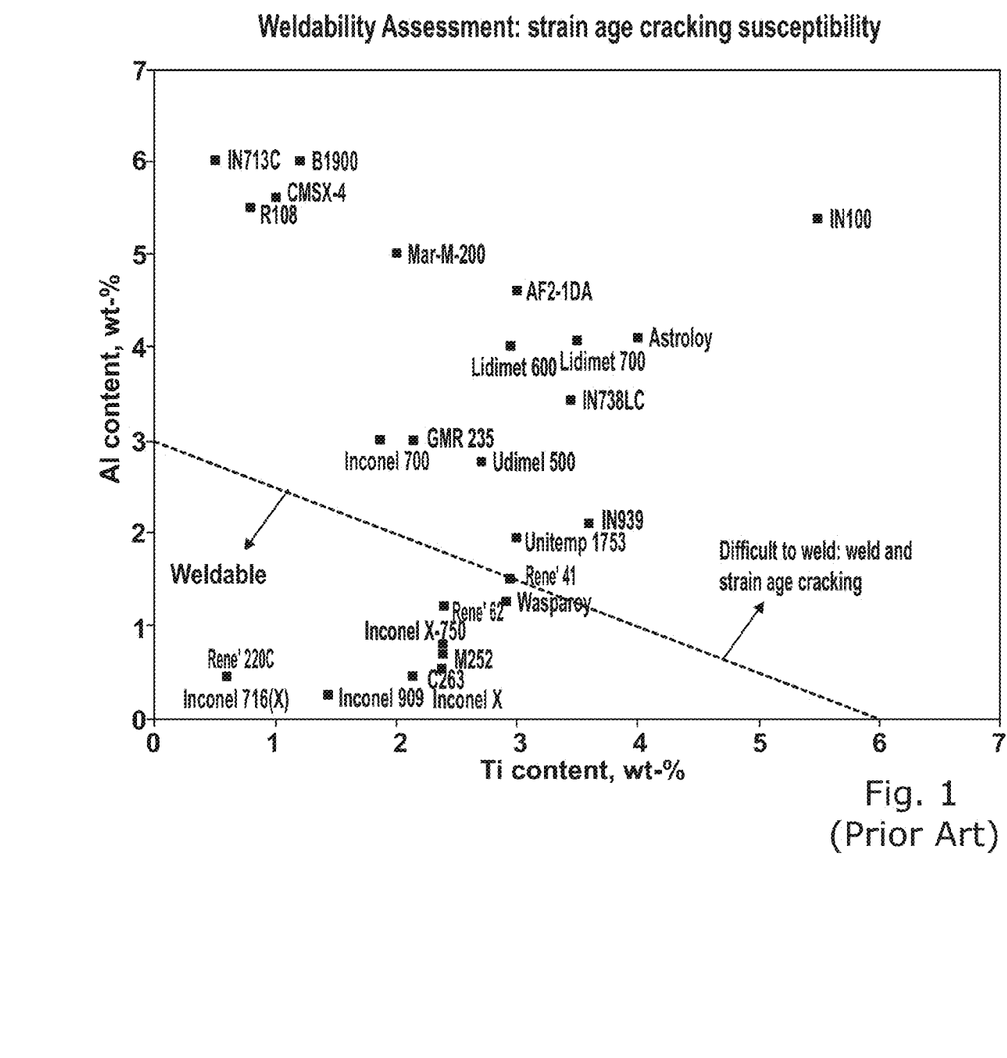
FIG. 1 is a known chart indicating the world ability of nickel alloys with aluminium and/or titanium additives.

A superalloy is generally defined as an alloy with excellent mechanical strength and creep resistance at high temperatures, good surface stability, and corrosion and oxidation resistance. Some of the most useful form secondary phase precipitates such as gamma prime and these gamma prime precipitates frequently include titanium and aluminium. These superalloys present numerous processing challenges are frequently represented on a diagram as shown at FIG. 1. The inventor has broadly observed that those superalloys to the left of the 'weldability' line e.g. Inconel 718 can be ALM processed without bulk heating to a high temperature, whereas the superalloys to the right of the 'weldability' line cannot.

It is well known that functional metal parts can be manufactured from a variety of pure metals and alloys using ALM. Historically a so-called "Liquid Phase Sintering" process was used to form mechanically hard parts such as moulds from proprietary multicomponent metal powder e.g. DirectMetal 20 and DirectSteel-products of EOS GmbH. Liquid Phase Sintering describes a process where one lower melting point component of the powder is melted by the laser, but the other higher melting point components remain solid. DirectMetal is described as "bronze-based matrix containing nickel" by its manufacturers with a remaining porosity of 8% and no heat treatment required or described. DirectSteel H2O is described as a "steel based multi-component metal powder" which when laser sintered formed a steel alloy of greater than 99.5% density which has 5~10% improved tensile strength and 10~15% improved yield strength after a heat treatment.

More recently with better suited lasers a full melt of many homogeneous metal powders has become commonplace. The powder feedstock for such parts is chemically homogeneous to the resultant alloy and made by the melting of a chemically homogeneous bar stock or elements and is of the composition required for the finished part.

In the best prior art ALM process the powder is fully melted where desired by the selective application of an energy source (typically a laser or electron beam) and then solidifies in order to produce, layer by layer, a fully dense metal part corresponding to a sliced design file. As the powder is fully melted and many metals and alloys have a high coefficient of thermal expansion the as-built part typically has considerable internal stresses and to retain dimensional accuracy the part is restrained by a build plate or jigs and fixturings during the build and throughout a subsequent heat treatment to substantially remove these stresses prior to removal from the base plate, jigs or fixtures. Additionally many metals go through a phase change as they cool from liquid adding further stresses.

In some alloys however—particularly nickel-based superalloys—the internal stress is sufficient to cause cracking of the part either during the ALM process or during the subsequent stress relief heat treatment. For example, an important subset of nickel superalloys with gamma prime alloying elements show this behaviour and are known to be difficult to work by conventional processes and are frequently classified as 'unweldable'. These alloys are also of significant commercial interest as they are widely used for very high temperature applications—such as in combustion components in engines and frequently can only be cast and are difficult or impossible to repair.

The prior art solution is to add heat to the area of the melting metal to minimise thermal mismatching of the solid metal already formed and solidifying. In the case of lower melt temperature metals e.g. titanium, this may be a practical pragmatic solution, however for the superalloys particularly nickel based superalloys of interest it is either practically or commercially disadvantageous to heat the part because of the high temperatures necessary but also the time for which that temperature needs to be applied and the controlled cooling to achieve a sufficient stress reduction and no cracking.

Bourell U.S. Pat. No. 5,296,062 discloses the use of "powder comprising particles of a first material coated with a second material, said second material having a lower softening temperature than said first material".

Bampton in U.S. Pat. No. 5,745,834 describes various methods for "selective laser binding and transient liquid sintering of blended powders". These include a method where 3% Boron (a known melt point depressant) is added to a top layer of Haynes 230 superalloy powder representing 15% of the total layer thickness and a pre-heat applied to a temperature just below the melt point of the layer with Boron added. A laser is then applied to selectively melt the layer with the melt temperature depressant Boron. This liquid metal wicks into the 85% layer thickness beneath it and the Boron diffuses out of the liquid phase into the solid powder to produce "a nearly fully dense segment of the component." Bampton points out that it is difficult to process at such a high (pre-heat) temperature on conventional equipment and that there is a significant temperature gradient from the laser melted spot of typically in excess of 100 deg C. and the bulk thereby creating residual stresses.

Bampton also describes a process where polymer powders are blended with the metal and a laser layer process carried out. The binder is burnt out leaving a porous metal powder solid state sintered together. This porous sintered part is then densified by either encapsulation and then Hot Isostatic Pressing or a lower melting point liquid metal infiltration. Both processes have significant disadvantages. The HIP'ed object will have substantially shrunk—and this process is laborious. In the case of the liquid metal infusion, the solid part is not 100% of the desired alloy and therefore does not have the desired mechanical properties.

Bampton then describes a mix of three powder components including the desired parent metal, the same base metal with melt point depressant and a polymer binder where the layers are built "by localized laser melting of the polymer constituent of the powder which rapidly resolidifies to bind the metal particles of the powder with connecting necks or bridges." The binder is then eliminated in a furnace creating a low strength part (generally) requiring temporary support from e.g. ceramic powder during a transient liquid sintering process.

Also known (WO/0211928) are all metal powders (no polymer) with melt temperature depressant additives e.g. Boron or Carbon included. And the additions may be at a small percentage of total powder but when used as a discrete powder it may local present at far higher percentages thereby initiating melting, wetting and bonding of the powder to form an object that is substantially fully dense.

Similarly US2004/0182201 describes a process where "graphite is also used in sintering iron based powder for the purpose of lowering the melting point of the composition to be sintered . . . " "graphite powder is considerably effective to improve the wettability during melting or to reduce microcracks during solidification of high-density portions".

In Hede, WO 02/092264 the then current (November 2002) method and powders for Selective Laser Sintering with metal powders and laser (and all known free form methods) is described as not capable of producing a fully dense material-5-30% porosity remaining; Infiltration with a low melting point material being required.

Hede describes trials with tools steels leading to "a martensitic layer of high hardness and internal stresses making it difficult (impossible) to smooth the layer deposited with a scraper before applying the next layer" and with "a major risk of fissuring".

Hede then describes the use of iron and copper based precipitation hardening alloys that would "give a soft material directly after laser sintering . . . the desired hardness could then instead by achieved by precipitation hardening . . . after laser sintering." Iron alloys and in particular a maraging steel and 17-4PH stainless steel is described. Whilst the maraging steel 18NiMAR250 was tested Hede then goes on to speculate more broadly including 17-4PH as an example material that will precipitate harden.

At this time (2011) 17-4PH stainless steel alloy is one of the most widely used metal powders in laser Selective Laser Sintering equipment and has been so for many years. The applicants use it in their business on a daily basis. As recently as 2006 it was widely described (e.g. by EOS GmbH) as 'precipitation hardening' but in fact it has been found by the applicants that 17-4PH alloy powder does not precipitate harden after processing in the commercially available EOS M270 machine and 17-4 powder is no longer marketed as a precipitation hardening powder material. Clearly we are in a new area where broad speculation cannot be relied upon as a good guide to materials performance in selective laser processing plus post-build heat treatments.

Tegal DE 10039143 at [003] describes the problem to solve as being high levels of porosity when metallic components are produced from conventional powder mixtures. He describes a density of approximately 90% of the theoretical density with a steel powder and in laser-sintered parts of bronze, a residual porosity of about 30% remains.

The disclosure describes laser sintering a powder material comprising a mixture of at least two powder elements and is characterized in that the powder mixture is formed by iron powder as the main component and by further powder alloying elements, which are present in an elementary, pre-alloyed or partly alloyed form and that a powder alloy results from these powder elements in the course of the laser sintering process.

Tegal further amplified this by saying the powder alloying components are converted during the laser sintering process within milliseconds into a powder alloy, of which the component consists. Any subsequent treatments are described as for homogenization, stress relief annealing, heat treatment, reduction in internal defects and improvement in the surface quality.

It should be noted that the state of the art has advanced considerably since this disclosure was filed in the year 2000 and with current generation equipment (that fully melts rather than sintering the metal powder) porosity on the scale described by Tegal is no longer a problem.

SUMMARY

By contrast the processes and materials we describe here do not need to contain coated powder, polymers or require the formation of a porous or 'green' state prior to subsequent heat treatments. We are not trying to solve a porosity problem resulting from sintering (not melting) the metal powder. We are creating a superalloy, not creating a 'soft' material or a precipitation hardening iron or copper based alloy that is subsequently precipitate hardened. We are not adding or using a melt point depressant such as boron or graphite (carbon) to achieve the process of the invention. We are also not forming the alloy during the laser 'sintering' process—we are explicitly not forming the alloy then, because this would result in failure as the alloy we wish to form will crack in the laser process. We are forming the alloy during a subsequent heat treatment cycle.

From one aspect the invention consists in a method of forming an article including:
  (i) forming a layer of a mixture of at least two distinct metal powders selected such that when combined they are chemically in the proportions of a superalloy containing a gamma prime phase
  (ii) fusing the powders locally without diffusion to define the shape of a part of the article such that the materials of the distinct metal powders remain substantially chemically segregated forming regions of different chemical composition
  (iii) repeating steps (i) and (ii) until the derived article is formed; and
  (iv) heat treating the finished article such that at least one of the distinct separate materials diffuses to form a gamma prime phase containing superalloy with the other.

The invention also consists of a metal powder for layer processing, chemically comprising the elements of a gamma prime forming superalloy less a substantial portion of one of its gamma prime forming alloying elements. The alloy may generally be nickel based and the gamma prime forming element mayl generally be aluminium. Well known gamma prime hardened superalloys include: Inconel 713C, Inconel 100, MAR M247, MAR M200, Inconel 738, RR1000, UDIMET 500, Inconel 939, Unimet 720, MAR M002, CMSX-4, Haynes 282, Rene 41, This metal powder can be present alone or as a mix comprising this metal powder mixed with a second powder chemically comprising its gamma prime forming elements such that together they form a non-homogenous physical mix of powders. This mix of powders chemically can then equate to a recognised nickel superalloy. The second powder can contain aluminium and also titanium and could conveniently be titanium aluminide (TiAl, TiAl3, Ti3Al).

What the Applicants have appreciated is that using, for example, a locally acting laser to fuse the desired parts of the material together to form the shape of a layer of the article, they can build up an effective matrix, in the shape of the intended article, from one powder of the component of the mixture and hold the other powder constituent in a substantially chemically segregated manner. Thus by selecting the powder which forms the matrix, i.e. the bulk powder, to be one which does not have high internal stresses that induce cracking, they can form an article that does not readily crack either during ALM building on removal from the base plate and/or under a first heat treatment to stress relieve the article.

Thus in a preferred embodiment the mixture of powders includes one powder component which constitutes over 50% of the mixture and thus forms the matrix bulk of the article. Preferably the component forms over 60% by weight of the mixture. In some embodiments the component can be nickel or in other embodiments the bulk component can be nickel and chromium. In still further embodiments the bulk component may include or consist of iron.

In a preferred embodiment the diffusion in step (iv) takes place by solid state diffusion.

As mentioned above the method may also include stress relieving the article by heat treatment prior to step (iv).

In a particularly preferred embodiment wherein it is intended to form a superalloy containing an additive x at a concentration C. The method may include blending two powders A and B wherein A is the intended bulk constituent of the superalloy having a concentration of an additive x where $x=(C_x)_A$ selected to allow processing without cracking and wherein powder B is a minor constituent of the intended alloy with a concentration of $x=(C_x)_B$; blending the powders A and B together so that B is a fraction of f of the whole such that $C_x = f \cdot (C_x)_B + (1-f) \cdot (C_x)_A$ and wherein $(C_x)_B > (C_x)_A$.

Each of the powders may be melted locally during step (ii). The powders may be selected out of materials less susceptible to stress cracking than the intended alloy. The intended alloy may be a nickel based superalloy. The alloy may include an additive x which may be aluminium or titanium or both. X may form more than 4% by weight of the powder.

From another aspect the invention consists in selecting and mixing two or more powder compositions that chemically add to the proportions of a desired superalloy and performing an additive layer process on this mixture such that they fully melt to form a substantially dense metal mix that is not the desired superalloy and which is characterised as having a sufficiently low stress so as not to crack during building or subsequent heat treatments and heat treating the metal mix to form the desired superalloy without cracking.

BRIEF DESCRIPTION OF THE DRAWINGS

Although the invention has been defined above it is to be understood it includes any inventive combination of the features set out above or in the following description. The invention will now be defined, by way of example, with reference to the accompanying drawings in which.

DETAILED DESCRIPTION

FIG. 1 is a diagram taken from Nickel Based Superalloy Welding Practices for Industrial Gas Turbine Applications by MB Henderson and others and is after a diagram found in G. Cam and M Kocak, 'progress in joining advanced materials' International Materials reviews, 43, no 1 (1988). Similar diagrams are widely found in the literature concerning welding and strain age cracking of alloys containing gamma prime precipitates.

At this time this diagram (and inferences drawn from it) is believed by the inventor to give a good guide as to which superalloys are thermal ALM processable 'crack free' by the prior art. For the purposes of this analysis thermally based ALM may be considered as a type of welding. It is said that when the total aluminium and titanium level of a particular alloy exceeds a threshold value often taken as 4 wt % then it is deemed 'difficult' to weld, becoming increasingly more difficult as the percentage increases.

Figure 2:
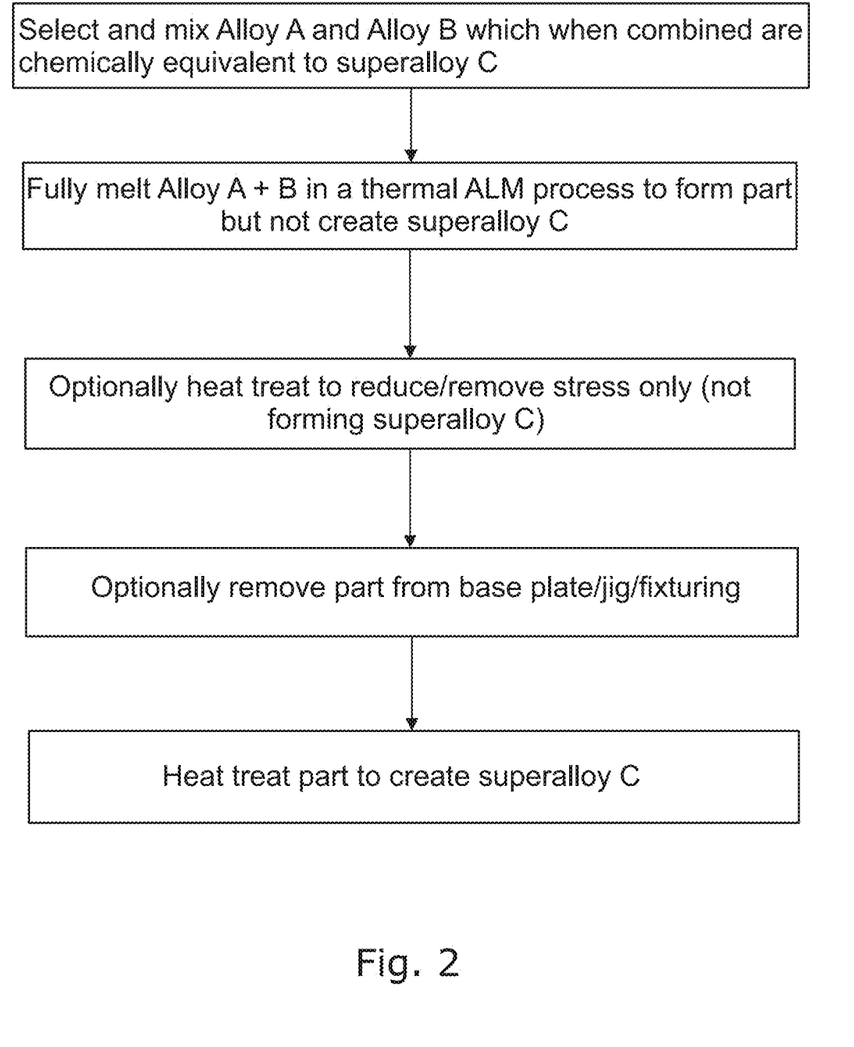
FIG. 2 is a flow diagram of an embodiment of the invention.

FIG. 2 is the process flow of the embodiment invention. Note that alloy A and Alloy B need not be recognised alloys because the metal powder feedstock for the ALM process may be made to order from elemental materials and any composition may therefore be ordered at no additional cost or delay.

Figure 3:
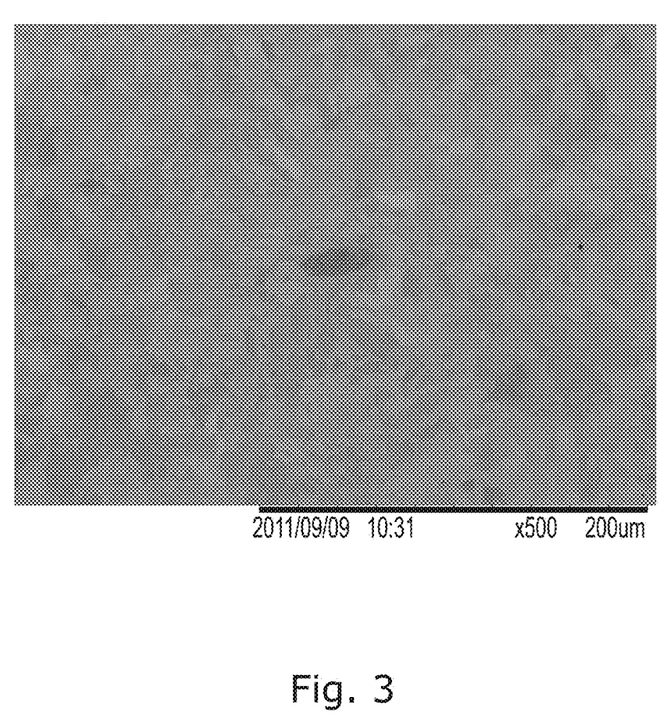
FIG. 3 is a micrograph of a sample after ALM.
Figure 4:
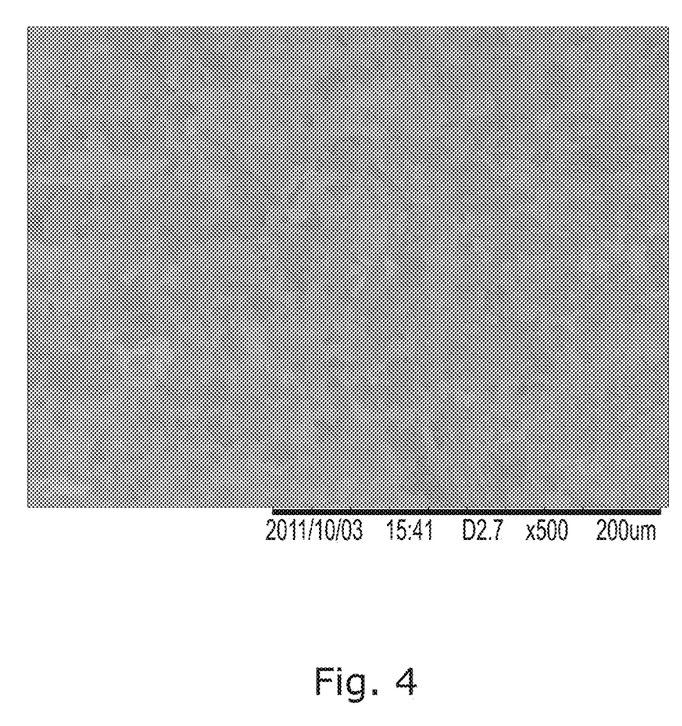
FIG. 4 is a micrograph of a sample after ALM and subsequent heat treatment.

FIGS. 3 and 4 are respectively micrographs of a sample of an embodiment of the invention immediately after ALM and a sample after ALM and subsequent heat treatment.

Thus the inventor has recognised the following new possibilities:

1] The selection and mixing of two or more powder compositions that chemically add to the proportions of the desired superalloy,
2] Additive layer processing this mix of powders where they fully melt to form a substantially fully dense metal 'mix' that is not the desired superalloy and is characterised as having a sufficiently low stress as to not crack during building or subsequent heat treatments,
3] Heat treatments of the metal mix to form the desired superalloy without cracking.

It should be noted that the stresses generated by a near ambient temperature thermal ALM powder bed process are such that a substantial base plate typically weighing 20 KG is required to resist mechanical relaxation caused by the as-built stress. This significantly complicates further thermal processing as it adds significantly to the thermal mass. A method that allows the part to be removed from a base plate or jigs and fixturing crack free prior to high temperature and sophisticated heat treatments is therefore desirable.

In a particular embodiment powder A has an elemental chemical composition approximating an "easy to process" alloy and would generally be the major constituent of the powder mixture. Powder B on the other hand has a chemical composition of elements such that when blended with Powder A in the correct ratio, will result in an overall chemical composition of its elements corresponding to that of the desired final superalloy. Thus if we wish to manufacture parts from a superalloy containing an additive element x at concentration $C_x$ we would blend two powders, A and B. Powder A being the bulk constituent would have a lower concentration of element x, $(C_x)_A$, such that it could be processed without cracking. This is referred to below as the "bulk powder". Powder B being the minor constituent would have a higher concentration of element x, $(C_x)_B$ and would be blended with powder A to make up a fraction f of the whole, such that:

$$C_x = f \cdot (C_x)_B + (1-f) \cdot (C_x)_A \qquad \text{Equation 1}$$

Powder B is referred to below as the "dopant powder".

During ALM processing, both Powder A and Powder B will be fully melted but, due to the short time spent in the liquid phase, would remain as substantially segregated regions with differing chemical compositions.

If several additive elements are employed in an alloy, then the dopant powder can have the appropriate concentrations of each of them. Alternatively, further dopant powders can be blended, each introducing a different element. Clearly it might sometimes be beneficial to introduce all of a particular additive element within a dopant powder. Furthermore, in the limit, a dopant powder could be pure additive element.

The resulting structure in the ALM formed part will be that of isolated islands of material having the approximate composition of the dopant powder, surrounded by a matrix of material having the approximate composition of bulk powder. Because the mechanical properties and internal stresses are dominated by the bulk powder, the resulting material may be ALM built and heat treated without cracking. It should be noted that the as-built part is fully melted, essentially dense and chemically equal to the desired superalloy, but is not in the microstructure of the desired superalloy. The microstructure is generated as a discrete second stage process by heat treatment.

It is known that powder blends are sometimes used in ALM to e.g. manufacture mould tools by laser sintering—one such process is Direct Metal Laser Sintering. It should be noted that such sintering processes do not fully melt the material, the material is not fully dense and heat treatments are not employed to form a high performance superalloy—the use of the term 'direct' indicates that further heat treatments are not necessary to form the desired material.

In the invention a subsequent heat treatment (single step or multistep) is then employed to cause additive x to diffuse out of the high concentration dopant islands into the low concentration bulk, resulting in a superalloy of the required microstructure with e.g. the characteristic precipitation of the final alloy and in particular the gamma prime precipitates.

A suitable heat treatment may include solution and aging steps. Firstly dissolving the gamma prime precipitates, topologically closed packed phases and carbides into the gamma matrix and then aging to form the precipitates and carbides into the desired shapes and configurations. In this manner a part in the high performance superalloy is achieved without cracking.

In a preferred embodiment for the addition of both aluminium and titanium, it is convenient to add an appropriate quantity of one of the titanium aluminide inter-metallics. A proof of principle experiment has been performed using a bulk powder made from the nickel superalloy C263. To this was added 4 weight. % of $TiAl_3$ powder. C263 is a gamma prime containing alloy having moderate concentrations of aluminium and titanium. It is generally regarded as a weldable alloy and can be ALM processed without cracking. The addition of 4 weight % $TiAl_3$ takes the overall titanium/aluminium concentration to the regime of the difficult to weld alloys such as C1023 which are subject to cracking when processed by ALM methods. The photomicrograph in FIG. 3 shows a sample of this material immediately after the ALM process. Distinct dark regions (such as the one near the centre of the image) containing high concentrations (analysis by Electron Diffraction Spectroscopy) of titanium and aluminium can be seen dispersed throughout the material. This demonstrates that these elements do not diffuse significantly during the very brief melt period imposed by the ALM process. The photomicrograph in FIG. 2 shows a further sample of the material which was subjected to a solution heat treatment subsequent to the ALM process. No such distinct regions of high aluminium/titanium concentration are visible. This indicates that these elements can indeed be successfully dispersed into the bulk by solid-state diffusion during such a heat treatment. Furthermore no evidence of cracking has been observed despite the high levels of gamma prime forming elements present.

What is claimed is:

1. A method of forming a superalloy article using additive layer manufacturing (ALM) building and heat treatment processes, the method comprising:
   (i) procuring a mixture of two or more powder components that each chemically make up only part of the composition of a desired superalloy but which together are chemically proportionate to the composition of the desired superalloy;
   (ii) performing an ALM process using the mixture, the ALM process comprising building the article layer-by-layer by forming layers comprising the mixture one on another and selectively applying sufficient energy to regions of each of layers to fully melt said two or more powder components in the layers and produce a substantially dense 'mix' in the shape of an article that is not the desired superalloy but which is characterised as having a sufficiently low stress and so as not to crack during the building or a specified heat treatment process; and
   (iii) subsequently performing the specified heat treatment process, wherein the heat treatment process comprises heat treating the article to form the desired superalloy, whereby the desired superalloy does not crack during the heat treatment process.

2. A method as claimed in claim 1 to form a superalloy containing an additive X at a concentration C, and wherein the step of procuring two or more powder components includes:
   blending two powders A and B wherein powder A is an intended bulk constituent of the superalloy and is provided in a concentration of $x=(C_x)_A$ selected to allow processing without cracking;
   powder B is a minor constituent of the intended superalloy and is provided with a concentration of $x=(C_x)_B$; and
   powders A and B are blended together so that B is a fraction of the whole such that $C_x=f\,(C_x)_B+(1-f)\,(C_x)_A$ and wherein $(C_x)_B>(C_x)_A$.

3. A method as claimed in claim 1 wherein the superalloy is a nickel based superalloy.

4. A method as claimed in claim 1 wherein the superalloy includes an additive x.

5. A method as claimed in claim 4 wherein x is aluminium or titanium or both.

6. A method as claimed in claim 5 wherein x forms more than 3.5% by weight of the powders.

7. A method as claimed in claim 1 wherein more than 50% by weight of the mixture of powder components is powder comprising at least one metal which when forming parts of the article in said 'mix' during the ALM process does not crack during.

8. A method as claimed in claim 7 wherein the more than 50% of the mixture is of Ni, Cr or Fe or a mixture or alloy of at least two of them.

9. A method as claimed in claim 1 wherein during the ALM process the two or more powder components are fully melted but resulting materials of the metal powders remain as substantially segregated forming regions of the article with differing chemical compositions.

10. A method as claimed in claim 1, wherein the heat treating includes solutioning and aging steps.

11. A method as claimed in claim 1, wherein the heat treating of the article to form the desired superalloy comprises forming a desired microstructure of the desired superalloy.

12. A method of forming a superalloy article including:
   (i) procuring a mixture of two or more powder components that each chemically make up only part of the composition of a desired superalloy but which together are chemically proportionate to the composition of the desired superalloy;
   (ii) performing an additive layer manufacturing (ALM) process, comprising building an article layer-by-layer using the mixture, to produce a substantially dense 'mix' in the shape of the article that is not the desired superalloy but which is characterised as having a sufficiently low stress and so as not to crack during the building or a specified heat treatment process; and (iii) subsequently performing the specified heat treatment process, wherein the heat treatment process comprises heat treating the article to form the desired superalloy, whereby the desired superalloy does not crack during the heat treatment process; and wherein during the ALM process the two or more powder components are fully melted but resulting materials of the metal powders remain substantially segregated forming regions of the article with differing chemical compositions.

13. A method as claimed in claim 12, wherein the heat treating of the article to form the desired superalloy comprises forming a desired microstructure of the desired superalloy.

14. A method as claimed in claim 12 wherein the superalloy includes an additive x.

15. A method as claimed in claim 14, wherein the heat treating causes the additive to diffuse out of at least one of the substantially segregated regions, having a concentration of the additive highest among those of the segregated regions, into at least another of the substantially segregated regions to form the desired superalloy.

* * * * *